United States Patent Office 3,401,779
Patented Sept. 17, 1968

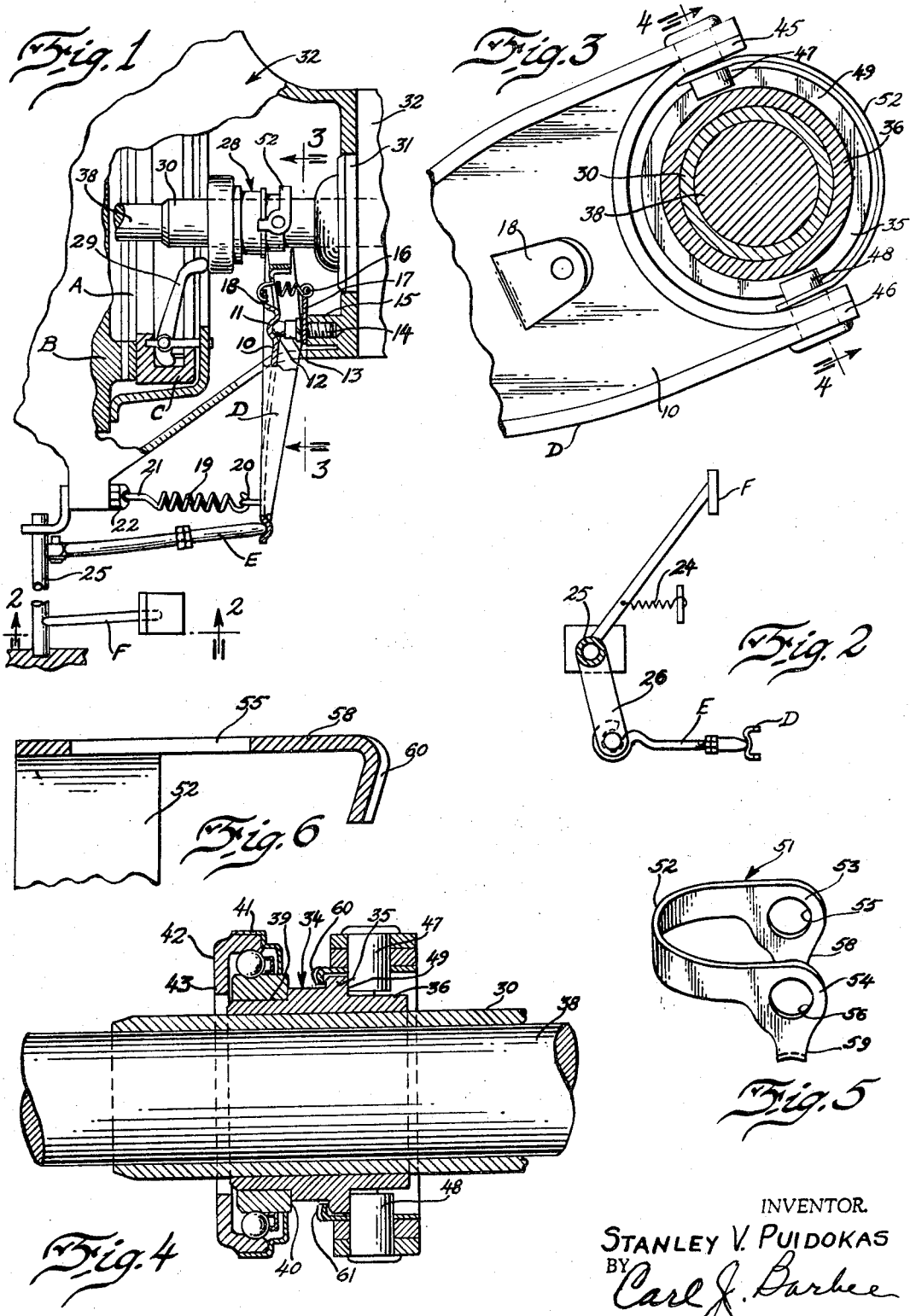

3,401,779
CLUTCH OPERATOR WITH BEARING CLIP
Stanley V. Puidokas, Kenosha, Wis., assignor to American Motors Corporation, Kenosha, Wis., a corporation of Maryland
Filed May 15, 1967, Ser. No. 638,312
4 Claims. (Cl. 192—98)

ABSTRACT OF THE DISCLOSURE

A vehicle clutch of the type in which clutch releasing is accomplished via manually operated means. The clutch throw-out bearing assembly is fabricated of sintered iron and has an annular flange against which the pins carried by the throw-out lever act to effect reciprocatory movement of the throw-out bearing in accomplishing clutch release. A clip has appropriate ears overhanging the bearing flange and ties the throw-out lever relative to the flange so that reciprocatory movement of the bearing in clutch engaging direction is accomplished.

Background of invention (1) *Field of invention.*—The invention is in the field of manually operated clutches and is directed toward the construction of the throw-out bearing and throw-out lever.

(2) *Description of the prior art.*—In the prior art throw-out bearings were fabricated by machining the bearing sleeve in such a manner as to provide two annular flanges spaced axially from each other to provide an annular channel into which the pins on the throw-out lever projected. Thus the throw-out lever would effect reciprocatory movement of the throw-out bearing in either clutch releasing or clutch engaging direction, by virtue of the pins alternating between engagement with one flange and then the other. This type of clutch actuating mechanism works satisfactorily, however, the machining of the bearing is costly. The clutch operating mechanism of the applicant contemplates the use of a throwout bearing fabricated of sintered iron, with a single flange—such bearing being less costly than the machined bearing.

Summary of the invention

The invention contemplates a throw-out bearing in which the bearing sleeve has an annular flange against which the pins on the throw-out lever act in accomplishing clutch release. A clip has diametrically opposed ears which overhang the flange and also has apertured portions, through which apertures the throw-out lever pins project so that the throw-out lever is tied to the annular flange to effect movement of the throw-out bearing to effect clutch engagement.

Brief description of drawing

FIGURE 1 is a fragmentary sectional view of a manual type vehicle clutch assembly embodying the invention.
FIGURE 2 is a schematic view taken on the line 2—2 of FIG. 1.
FIGURE 3 is an enlarged fragmentary sectional view taken on the line 3—3 of FIGURE 1.
FIGURE 4 is an enlarged sectional view taken on the line 4—4 of FIGURE 3.
FIGURE 5 is a perspective detail view of the clip of the invention.
FIGURE 6 is an enlarged fragmentary sectional detail view of the clip of FIGURE 5.

Description of preferred embodiment

Referring to FIGURE 1, a conventional type vehicle clutch assembly is shown in which a friction circular disk type of clutch plate A is interposed between the fly wheel B and the clutch pressure plate C. The clutch throw-out lever D is actuated by clutch link E which in turn is actuated by clutch pedal F.

The throw-out lever D is comprised of a stamping having a body portion 10 with a recess 11 for receiving the ball 12. The ball is positioned between the recess 11 and pivot stud 13. The stud has a shank 14 which is threaded into clutch housing boss 15. A tension spring 16 has one end received in support member 17 and the other end received in a tab 18 which is formed in the body portion of the throw-out lever.

The spring 16 holds the throw-out lever in continuous engagement with the ball pivot 12. Spring 19 has one end 20 secured to the throw-out lever and the other end 21 secured to the bracket 22 which is anchored to the clutch housing and the spring holds the throw-out lever in continuous engagement with link E. The clutch pedal F is continually urged in clutch engaging direction by the spring 24.

Viewing FIGURE 2 rotation of the clutch pedal F about the axis of shaft 25 in counter-clockwise direction causes the link 26 to move the clutch link E so as to move the clutch throw-out lever D in a counter-clockwise direction (viewing FIG. 1) about the ball pivot 12. Such movement of the throw-out lever causes the throw-out bearing assembly, identified generally by the numeral 28, to shift axially to the left, when viewing FIG. 1, causing the clutch levers 29 to move the clutch pressure plate C in a direction to the right, thereby disengaging or releasing the clutch. The forked ends of the clutch throw-out lever must be tied with reference to the throw-out bearing assembly 28 so as to shift the bearing assembly axially in either direction on the support member 30. The support member 30 has an enlarged end portion 31 which is anchored in the end wall of the transmission housing 32.

Viewing FIGURE 4 I have shown the clutch throw-out bearing assembly which includes the tubular bearing sleeve 34 which has a radially outwardly projecting flange 35 and a diametrically reduced end portion 36. The bearing sleeve is reciprocably carried on the support member 30 through which the clutch shaft 38 projects.

The diametrically reduced portion 39 on the bearing sleeve receives the inner race 40 of the ball bearing assembly 41. The outer race 42 has an end wall 43 against which the clutch levers 29 engage. The bearing sleeve 34 is fabricated of sintered iron and is impregnated with a suitable lubricating oil.

Referring to FIGURE 3 the clutch throw-out lever is formed with a fork at one end resulting in fork branches 45 and 46. Pins 47 and 48 are anchored in the respective branches 45 and 46, and the pins bear against the end wall 49 of the flange 35 in moving the sleeve bearing in clutch releasing direction.

A clip identified generally by the numeral 51 includes an arcuate band portion 52 which terminates at each end with the enlarged portions 53 and 54. The enlarged portions are provided respectively with aperture 55 and aperture 56 through which the pins 47 and 48 of the clutch throw-out lever project. The band portion 52 partially encircles the bearing sleeve and the terminal portion 53 and 54 are provided with outwardly projecting ears 58 and 59 which terminate with the inwardly bent tabs 60 and 61. The tabs overhang the flange 35 and engage the face thereof opposite from the face engaged by pins 47 and 48.

Viewing FIGURE 4 when the clutch throw-out lever moves to the right, the clutch throw-out bearing assembly moves along therewith as a result of the tabs 60 and 61 engaging the annular flange 35.

I claim:
1. In a clutch actuating mechanism having clutch plates for engagement with each other during clutching action, a shaft projecting centrally through the plates, a stationary sleeve encircling the shaft, a clutch throw-out bearing reciprocably mounted on the sleeve, clutch levers mounted on one of the plates and being engageable with one end of the throw-out bearing, a clutch throw-out lever engaging the other end of the throw-out bearing, whereby actuation of the throw-out lever moves the throw-out bearing and the clutch levers, thereby disengaging the clutch plates, the improvement which comprises: a fork at one end of the throw-out lever providing substantially diametrically opposed branching; a pin projecting radially inwardly from each branch; a radially extending flange on the outer surface of the throw-out bearing, the pins contacting one face of the flange; a clip including a band portion partially encircling the throw-out bearing; an apertured terminal portion at each end of the band portion; an ear projecting outwardly from each terminal portion and over-hanging the flange so as to engage the face of the flange opposite from the face engaged by the pins.

2. In a clutch actuating mechanism having clutch plates for engagement with each other during clutching action, a shaft projecting through the plates, a stationary sleeve encircling the shaft, a clutch throw-out bearing reciprocably mounted on the sleeve, clutch levers mounted on one of the plates and being engageable with one end of the throw-out bearing, a clutch throw-out lever engaging the other end of the throw-out bearing, whereby actuation of the throw-out lever moves the throw-out bearing and the clutch levers, thereby disengaging the clutch plates, the improvement which comprises: a fork at one end of the throw-out lever including opposed branches; a pin projecting inwardly from each branch; a flange on the outer surface of the throw-out bearing, the pins contacting one face of the flange; a clip including a band portion partially encircling the throw-out bearing, an apertured terminal portion at each end of the band portion; said pins projecting into the apertures; an ear projecting outwardly from each terminal portion and over-hanging the flange so as to engage the face of the flange opposite from the face engaged by the pins.

3. A clutch actuating mechanism as set forth in claim 2 wherein the throw-out bearing has an annular external surface extending from the flange to the end of the bearing, said surface continuing uninterruptedly throughout its length.

4. A clutch actuating mechanism as set forth in claim 2 wherein the throw-out bearing includes a sleeve portion formed of a sintered metal.

References Cited

UNITED STATES PATENTS

| | | | |
|---|---|---|---|
| 1,780,749 | 11/1930 | Frehse et al. | 192—98 XR |
| 3,032,158 | 5/1962 | Glesmann et al. | 192—98 |
| 3,333,664 | 8/1967 | Chapaitis | 192—98 |

BENJAMIN W. WYCHE III, *Primary Examiner.*